United States Patent [19]
Warrington et al.

[11] Patent Number: 5,478,124
[45] Date of Patent: Dec. 26, 1995

[54] PORTABLE ROLLING BUMPER

[76] Inventors: Bruce Warrington, 32742 Alipaz #80, San Juan Capistrano, Calif. 92675; Ted McCaa, 1301 Chamberlain Ave., Bakersfield, Calif. 93305

[21] Appl. No.: 385,161

[22] Filed: Feb. 7, 1995

[51] Int. Cl.⁶ .................................................. B60R 19/54
[52] U.S. Cl. ............................ 293/125; 293/17; 293/117; 280/481; 280/416.1
[58] Field of Search ................................ 293/17, 49, 125, 293/117; 280/481, 495, 505, 507, 415.1, 416.1, 770, 767

[56]         References Cited

U.S. PATENT DOCUMENTS

| | | |
|---|---|---|
| 3,184,253 | 5/1965 | Bratton ................................... 293/17 X |
| 3,271,050 | 9/1966 | Saunders ................................ 293/117 X |
| 4,068,877 | 1/1978 | Burleson . |
| 4,381,122 | 4/1983 | Kite ........................................ 293/125 |
| 4,763,939 | 8/1988 | Zhu ......................................... 293/17 |
| 5,366,264 | 11/1994 | Guay ....................................... 293/125 |

*Primary Examiner*—Dennis H. Pedder
*Attorney, Agent, or Firm*—Patent Law & Venture Group; Gene Scott

[57] ABSTRACT

An adjustable bumper for mounting in a horizontally oriented non-round recess of a vehicle mount receiver so as to facilitate the pushing of one vehicle with another. The bumper has a straight leg adapter portion for engaging with the mount receiver, a cross-bar portion secured at a right angle to the adapter, and an elongate cylindrical roller held within the cross-bar portion between two laterally extended end arms. The adapter portion includes positioning apertures that allow the distance between the roller and the vehicle to be adjusted and the cross-bar portion has similar positioning apertures that allow the height of the roller to be adjusted.

5 Claims, 5 Drawing Sheets

PORTABLE ROLLING BUMPER

BACKGROUND OF THE INVENTION

1. Field of the Invention

This invention relates generally to a bumper attachment and more particularly to a portable rolling bumper attachment that can be easily attached and detached to a vehicle in several different positions so as to allow one vehicle to push another vehicle regardless of vehicle size variations.

2. Description of Related Art

Invention and use of rolling bumper attachments is known to the public, as such attachments are frequently employed as vehicle safety devices.

For example, Kite, U.S. Pat. No. 4,381,122 discloses a rolling bumper attachment for use as a safety device in the event of a vehicle collision. The device includes two horizontal rollers that are rotatably supported on the rear side of a front vehicle bumper adjacent to each end of the bumper. Thus, the rollers remain dormant unless the bumper is shoved rearwardly during a collision. However, in the even of a collision, the rollers move into rolling contact with the front wheels of the vehicle so that the wheels may continue to rotate. This enables the driver to maintain better control over the vehicle.

A roller configuration is likewise employed as a safety device in Zhu U.S. Pat. No. 4,763,939. This invention includes a set of vertical, parallel rollers consisting of a center shaft and an elastomeric buffer component sheathed around the shaft for freely rotating around it. The rollers are fixed on the car body at a location proximate to the vehicle wheels so that if and when an object comes into contact with the moving vehicle, the rollers effectively push the object out of the dangerous wheel area, thereby preventing injuries or damages.

Bumper attachments can also be used to enable one vehicle to push another. However, although both of the above described devices utilize a rolling, bumper mounted configuration, neither are appropriately designed for such activities. When a vehicle becomes stuck or breaks down unexpectedly, extra measures must be taken to move the vehicle to a desired location. Unfortunately, the bumper provided on almost all standard motor vehicles is not suited to push another vehicle. Thus, in such situations, it is often necessary to have the vehicle towed or pushed to a desired location by a specialized service station vehicle, a procedure which is typically quite expensive. To compound the problem, some vehicles, such as those employed in off-road trips, become indisposed at remote locations in the desert, mountains or the like, and are thus not readily available for these professional services regardless of the price.

Thus, there is a clear need for a bumper attachment that allows a standard automobile to push another. Burleson, U.S. Pat. No. 4,068,877 discloses one such rolling vehicle bumper. This bumper, designed to be secured to the front bumper of the pushing vehicle, has a resilient roller rotatably mounted on a bracket. The spin of the roller, together with its resilient construction, prevents a drag on and damage to a vehicle being pushed by the other. Usually, a pair of pushing bumpers are disposed in symmetrical relation on the front vehicle bumper for assuring continuous contact between at least one of the pushing bumpers and the vehicle being pushed.

However, while this device may be capable of enabling the pushing of a vehicle in some circumstances, its configuration limits it to very specific uses and makes it generally impractical. For instance, Burleson's bumper attachment, as with the other described prior art, is secured onto a vehicle in a permanent fashion, so that once the rollers are attached they stay in place on the vehicle. While this may be desirable when the roller is employed as a safety device, it is particularly impractical for pushing applications, as typically this is not a daily event, but rather an occasional one. The permanency of the prior art attachments also makes them impractical in that it forces one set of rollers to be purchased for every pushing vehicle.

Secondly, none of the other prior art has height adjustability features. Thus, if the vehicle to be pushed is of a different size than the vehicle containing the rollers, the pushing operation is impossible. And, considering the expansive variety of different vehicles commercially available today, bumper incompatibility is a significant limiting factor.

Even further, none of the prior art includes distance adjustability means. Thus, Burleson's device always positions the two vehicles at a fixed distance from one another. This, too, is impractical for effective, convenient vehicle pushing, as it is often desirable to place different sized and shaped vehicles at varying distances from one another depending on the terrain and other such factors.

Another drawback of Burleson's device, like the others, is that it is only attachable to the front bumper of a vehicle. However, in some instances it is more desirable to place a roller on the rear bumper of the vehicle to be pushed rather than the pushing vehicle. The prior art is incapable of this versatility.

Thus, there is a clear need for a rolling vehicle bumper attachment that can be quickly attached and detached to the front, rear or even sides of a vehicle at a selectable height and distance from the vehicle so as to efficiently, conveniently, and effectively facilitate the pushing of one vehicle with another. The prior art does not teach such applications, while the present invention fulfills these needs and provides further related advantages as described in the following summary.

SUMMARY OF THE INVENTION

The present invention is a rolling bumper designed to allow an object, such as a vehicle, to be pushed by another vehicle. The present invention can be easily mounted to any vehicle by means of a T-hitch or other vehicle mount receiver. Thus, it is an object of the invention to improve upon prior art by providing a removable, portable device that is easy to secure to a vehicle when needed, thus allowing the device to be removed from the vehicle between use.

It is another object of the invention to provide a product that can be quickly and easily moved from one vehicle to the next, thus saving the consumer money by allowing a single bumper to meet the pushing needs of several vehicles.

The unique mounting system of the present invention also provides a significant advantage over prior art devices in that it allows the bumper to be mounted to a vehicle at any desired location, rather than being limited to front bumper applications only. Thus it is an object of the invention to be positioned on either the pushing vehicle or the vehicle to be pushed at the convenience of the user.

The bumper has a straight leg adapter portion that engages with the mount receiver attached to the vehicle. The adapter portion has an elongate, rectangular shape and engages in the mount receiver so that it extends horizontally away from the vehicle. The adapter includes a series of placement holes that correspond to a placement hole in the receiver. Thus, to secure the adapter to the mount receiver, the adapter is simply slid the desired distance into the receiver and one of the placement holes is aligned with the receiver hole. A locking bar is then placed through the aligned holes, thereby securing the adapter at a desired distance from the vehicle.

Thus, it is an object of the invention to improve over the prior art by allowing the distance between the vehicle and the bumper, and hence the distance between the two vehicles, to be adjusted as needed. This is a particularly beneficial feature of the present invention, as a greater distance between vehicles is often desirable, especially when turning corners, so as to insure that the bumpers of the two vehicles do not meet while in transit.

The other end of the adapter terminates in a vertically oriented sleeve through which a cross-bar portion is secured. The sleeve holds the cross-bar at a right angle to the adapter, the two portions thus forming a T-shaped assembly. An end arm extends from each end of the cross-bar, the ends defining a space between them that is approximately equal to the length of the cross-bar. An elongate, cylindrical bumper roller is secured in the space between the two arms and situated so that it can rotate freely along a longitudinal axis as it comes into contact with another vehicle or like object.

The cross-bar and sleeve configuration is such that the cross-bar can slide freely through the sleeve, but it cannot be disengaged from it. The cross-bar also contains a series of placement holes that are to be aligned with a hole in the sleeve. Thus, to secure the bumper roller at a desired height in relation to vehicle, the cross-bar is simply slid to the desired height, one of the placement holes is aligned with the placement hole in the sleeve, and a locking bar or screw is inserted into the holes.

Thus it is an object of the present invention to significantly improve over all prior art device by providing a device in which the height of the bumper can be easily adjusted. This, too, is a particularly beneficial inventive feature of the present invention, as it enables a single portable bumper to accommodate vehicles with all different bumper heights and sizes. This feature is also crucial in overcoming size incompatibilities between the two vehicles, as the wide range of vehicles sizes would otherwise frequently prohibit proper use of the bumper.

Even further, it is an object of the invention to allow the roller to be oriented either vertically or horizontally, to further accommodate the needs of each individual situation. This is possible with the present invention because the adapter portion has symmetrical proportions and the mount receiver itself includes placement holes on all four side walls, thus allowing the adapter to be secured in the mount receiver in any position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

FIGS. 1–5 show an adaptable bumper that is designed to enable the pushing of one vehicle with another vehicle, regardless of the size and height variations between the two vehicles. The bumper is portable and can be easily attached to any portion of a vehicle simply by mounting it in a horizontally oriented non-round recess 4 of a T-hitch or any other standard vehicle mount receiver 6. In addition, the bumper includes features that allow its height, distance and spatial orientation to be quickly and easily adjusted without the use of any special tools, strength or skill.

Figure 1:
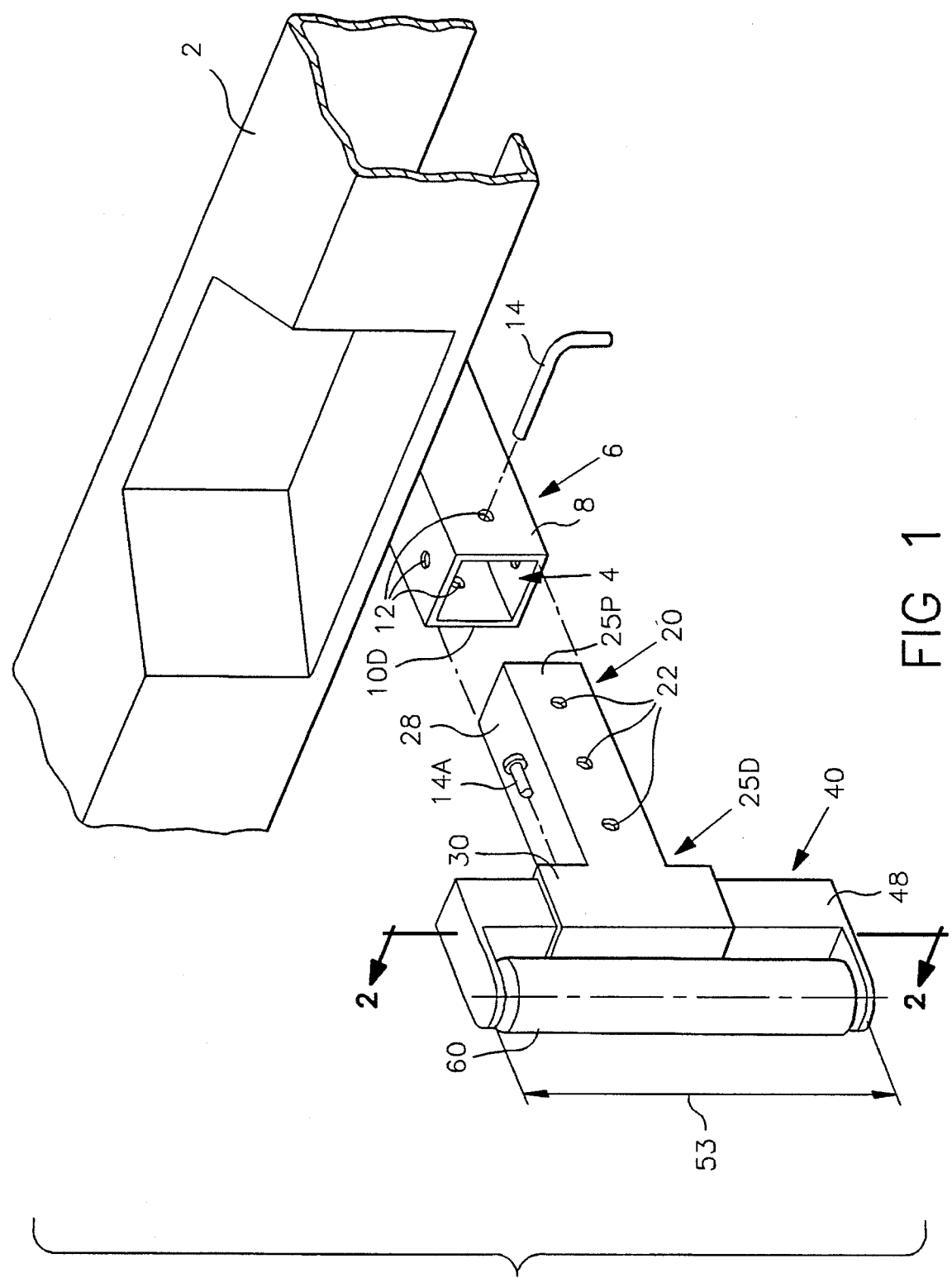
FIG. 1 is a perspective view of the invention, particularly showing the straight leg adapter portion aligned with a mount receiver so that the bumper roller extends from the vehicle in a vertically oriented position.

To understand the proper functioning of the present inventive adaptable bumper, a review of standard mount receivers 6 is helpful. As shown in FIG. 1, mount receivers 6 are generally secured to the underside of a vehicle so that a distal end 10D extends horizontally away from the vehicle. The mount receiver 6 is most generally of square tube construction having side walls 8 that enclose a hollow, non round recess 4. The distal end 10D of the receiver 6 is open, thus providing easy, immediate access to the recess 4. The distal end 10D of the receiver also includes a first locking means 12. Typically, as shown in FIG. 1, the locking means 12 consists of through holes or apertures placed in each side wall 8 in aligned positions.

The bumper itself includes a straight leg adapter portion 20 that is used to mount the bumper to the mount receiver 6. The adapter portion 20 has an elongated, preferably square shape with four symmetrical side walls 28 and a proximal 25P and distal end 25D. The shape of the adapter portion 20 is complementary to that of receiver 6, thus allowing the proximal end 25P of the adapter portion 20 to be slidably, non-rotatably engaged into the recess 4.

The proximal end 25P of the adapter portion 20 includes a first positioning means 22 that corresponds to the locking means 12 of the mount receiver 6. Thus, preferably the adapter's first positioning means 22 consists of a series of spaced apart through holes or apertures positioned on two of the parallel side walls 28 of the adapter 20. These holes are shaped, sized and positioned so that when the proximal end 25P of the adapter 20 is inserted into the recess 4, they are easily aligned with the aperture of the receiver's locking means 12. Once the sets of apertures are properly aligned, a locking bar 14 is engaged through them, thereby securing the adapter portion 20 to the receiver 6. In order to provide the most secure fit, the locking bar 14 must be of a length so that it extends from one side wall 8, across the recess 4 and through the aperture in the opposite side wall 8 of the receiver.

The distal end 25D of the adapter portion 20 has a rectangular hollow sleeve portion 30 that is adapted to be integrally engaged around a straight cross-bar portion 40 of the bumper. As seen in FIG. 1, the sleeve 30 is configured so that the cross-bar 40 is held at a right angle to the adapter portion 20, the two portions 20 and 40 thus forming a T-shaped assembly. The cross-bar portion 40 also has an elongated, generally rectangular shape with four side walls 48, and it is designed to slide freely, although non-rotatably, through the sleeve 30.

Figure 2:
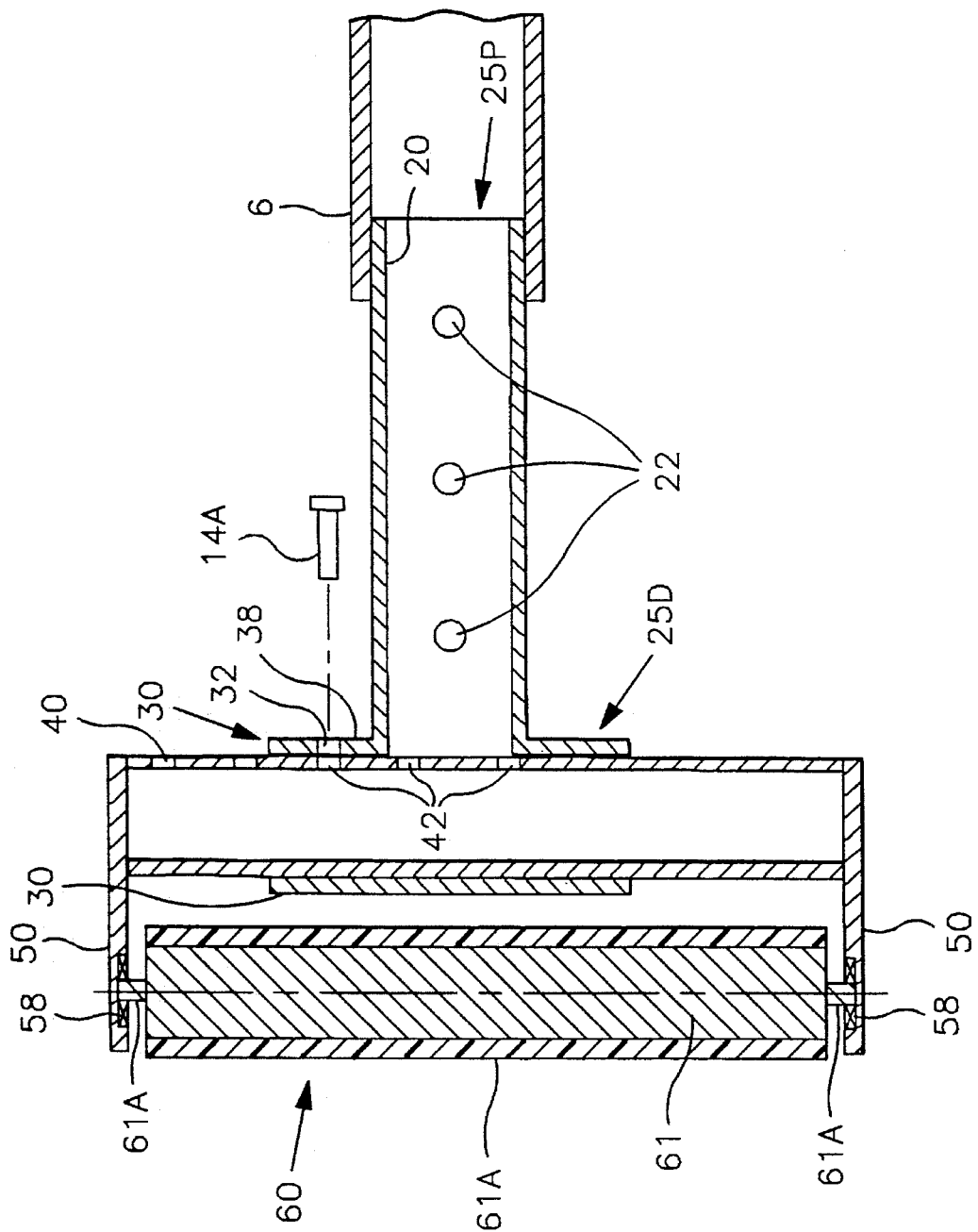
FIG. 2 is a cross-sectional view of the embodiment of FIG. 1, particularly showing the positionability of the cross-bar portion within the sleeve.

At least one of the side walls 48 of the cross-bar 40 includes a first positioning mean 42, which is preferably a series of spaced apart through holes or apertures that span the length of the side wall 48. As seen in FIG. 2, a corresponding side wall 38 of the sleeve 30 includes a second locking means 32, preferably a single through hole or aperture. Thus, to secure the cross-bar 40 at a selected position within the sleeve 30, the cross-bar 40 is simply moved to the desired position within the sleeve 30, the two positioning means 32 and 42 are aligned and a locking pin 14A or screw is engaged through the apertures.

As best illustrated in FIG. 2, an end arm 50 extends laterally from each end of the cross-bar portion 40 away from the vehicle. The arms 50 extend away from the cross-bar 40 in the same direction so as to define a space 53 between them. A roller engagement means 58, preferably a bearing set, is placed within each of the arms 50, and into the space 53 defined between the arms 50, a cylindrical bumper roller 60 is engaged between the two roller engagement means 58. The bumper roller 60 is preferably constructed of a rigid roller 61 covered with a resilient yet sturdy material 61A, such as hard rubber or plastic, and the entire assembly is free to rotate about a longitudinal axle 61A while held in the cross-bar portion 40. As clearly seen in the figures, the bumper roller 60 is the most distal component of the bumper, and is thus in a position for intimate contact with another vehicle or object. Depending on the needs of each individual situation, the bumper can be attached either to the vehicle doing the pushing, or the vehicle being pushed.

As described above, the present inventive bumper includes several features which give it greater versatility and adjustability, thus allowing it to more fully accommodate the specific needs of each individual situation. First of all, the multiple aperture configuration of the adapter's first positioning means 22 allows the distance between the adaptable bumper and the vehicle to be easily monitored and adjusted. When it is desired to move the roller 60 closer to the vehicle, the proximal end 25P of the adapter 20 is simply slid further into the recess 4 and secured with the locking bar 14, and when it is desired to move the bumper roller 60 further away from the vehicle, the adapter 20 is simply pulled further out of the recess 4 and secured with the locking bar 14.

Figure 3:
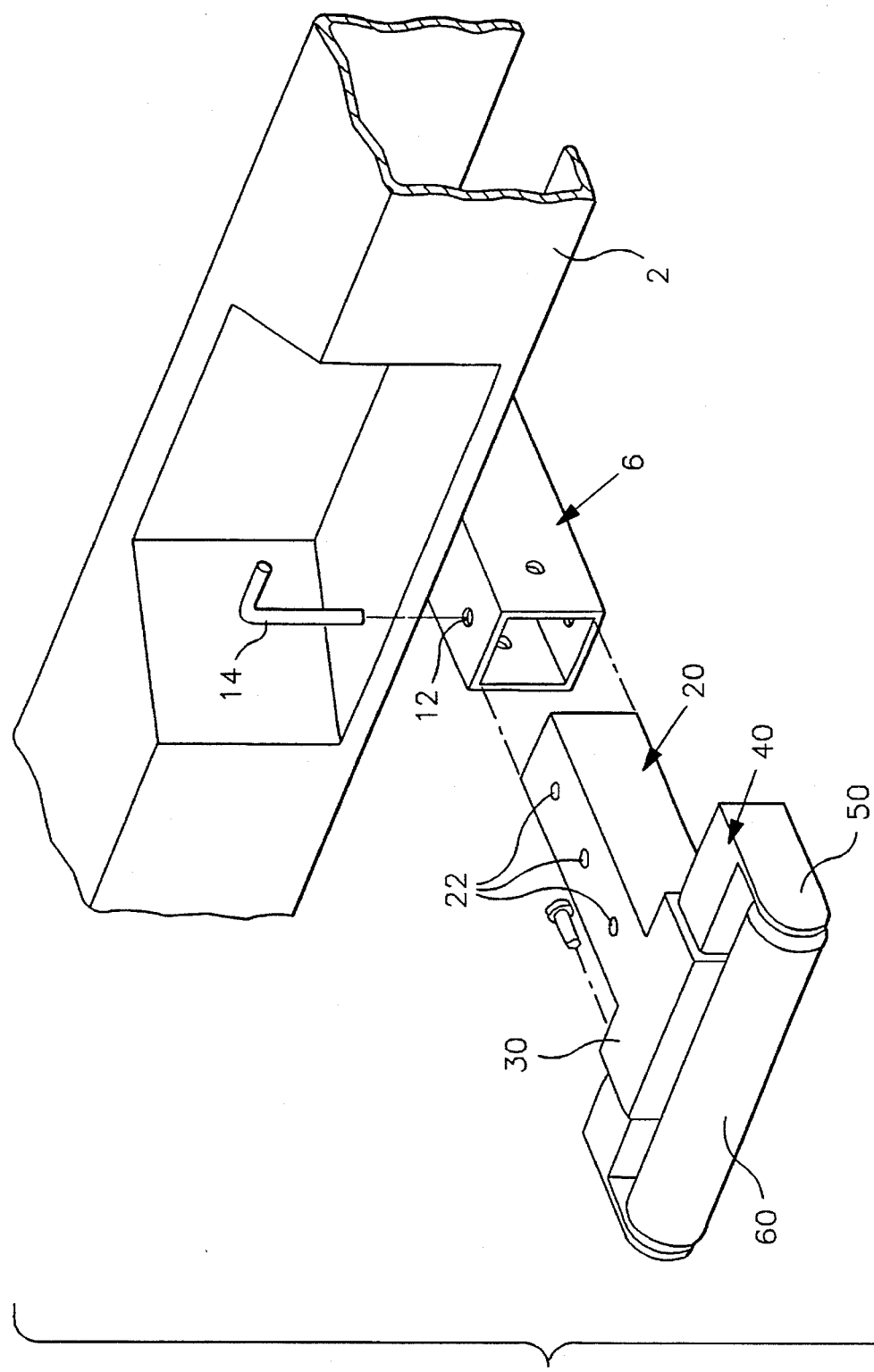
FIG. 3 is a perspective view of the invention of FIG. 1, particularly showing the straight leg adapter portion aligned with the mount receiver so that the bumper roller extends from the vehicle in a horizontally oriented position.

Since both the mount receiver 6 and the proximal end 25P of the adapter 20 are symmetrical, the adapter 20 can be secured in the recess 4 with any of its side walls 28 facing upwardly. Thus, as seen in FIG. 3, when it is desired to position the roller 60 horizontally instead of vertically, the adapter 20 need simply be repositioned within the recess 4 and secured with the locking bar 14.

Finally, the slidability of the cross-bar 40 within the sleeve 30 and the multiple aperture configuration of the cross-bar's positioning means 42 allows the height of the bumper to be easily and quickly adjusted. This feature enables one vehicle to push another vehicle even if the size of the two vehicles is incompatible. When the bumper roller 60 is positioned horizontally, this feature allows the roller 60 to be off-centered to the left or right side of the vehicle.

Figure 4:
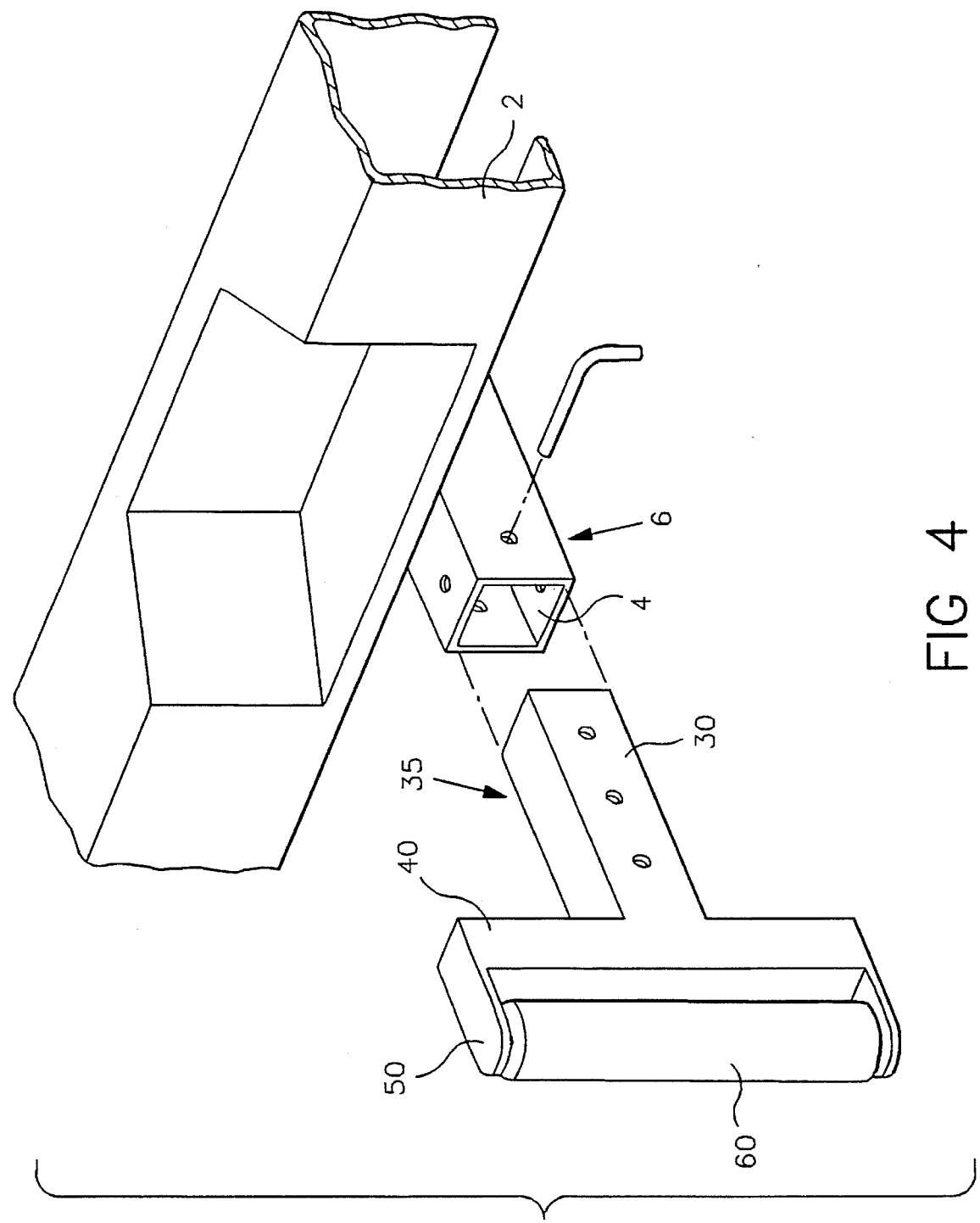
FIG. 4 is a perspective view of the invention of FIG. 1, particularly showing an alternate embodiment in which the adapter and cross-bar portions are formed as a single, non-adjustable, T-shaped unit.

FIG. 4 shows an alternate embodiment of the bumper in which the adapter 20 does not include the sleeve 30. The adapter 20 and cross-bar 40 are thus formed as a single, stationary T-shaped unit 35, which eliminates the height adjustability feature of the bumper. Such an embodiment is designed to reduce manufacturing costs and increase the strength of the bumper for applications that do not require the bumper to be positioned at variable heights.

In yet another embodiment, a separate bumper support portion 70 is provided so as to give the bumper an even greater height range and to improve the bumper's storability. In this embodiment, shown in FIG. 5, the adapter 20 and cross-bar 40A have an integral construction, forming one, stationary unit 35. The proximal end 25P of the adapter 20 mounts into the mount receiver recess 4 in the same adjustable manner as detailed above. However, the adapter 20 does not include the sleeve portion 30, and instead terminates with the cross-bar 40A. The cross-bar 40A is affixed at a right angle to the adapter 20 so that the two portions 20 and 40A form the stationary unit 35 in an L-shaped configuration.

The separate, U-shaped bumper support portion 70 consists of a linear body portion 75 with an end arm 50 extending laterally from each end of the body 75. As described in the previous embodiment, the arms 50 extend in a common direction so as to define a space 53 between them. A roller engagement means 58 is positioned within each of the arms 50 and an elongate, cylindrical bumper roller 60 is engaged between the two roller engagement means 58. The bumper roller 60 is free to rotate about a longitudinal axle 61A while held in the bumper support portion 70, and the roller 60 is designed to contact another vehicle or like object.

Figure 5:
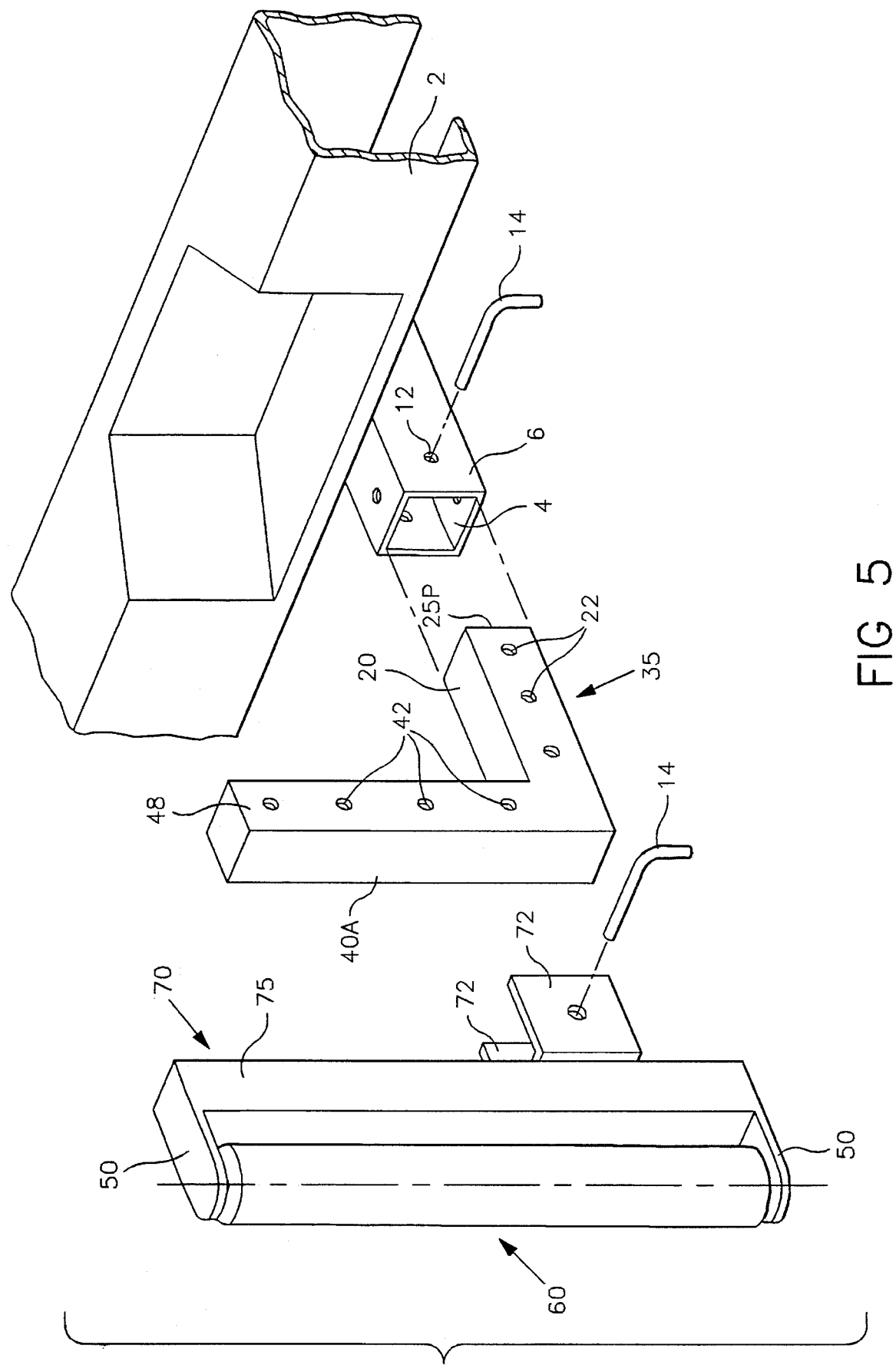
FIG. 5 is a perspective view of the invention of FIG. 1, particularly showing an alternate embodiment in which the adapter and cross-bar portions are formed as a single L-shaped unit and a separate U-shaped bumper support is included with ears for mounting to the cross-bar.

The linear body 75 provides a third locking means 72, and the cross-bar portion 40 provides the second positioning means 42. As illustrated in FIG. 5, the third locking means 72 is preferably a pair of parallel dog ears fixed to the body 75 so that they extend from the body in the direction opposite the roller 60. The dog ears have a space between them that is approximately equal to the width of the cross-bar 40A. The second positioning means 42 is preferably a linear series of spaced apart apertures provided on two parallel side walls 48 of the cross-bar 40. Thus, to secure the bumper support 70 to the cross-bar 40 the dog legs are positioned around the cross-bar 40A, the linear body 75 is moved to the desired height along the cross-bar 40A, an aperture in each dog leg is aligned with the appropriate aperture in the cross-bar 40 and the locking bar 14 is slid through the apertures to lock the bumper at that position. As seen in FIG. 5, this configuration allows the roller 60 to be positioned at a much greater range of heights than possible in the previously detailed embodiments.

In addition, by forming the bumper in two distinct, separate sections 70 and 35, this embodiment provides from more convenient storage of the bumper, as it can be stored as two smaller pieces rather than one rather large piece. Yet another advantage of such an embodiment is that, if it is desired to utilize a different size or style roller 60, the bumper support 70 is simply replaced rather than necessitating the replacement of the entire bumper.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An adaptable bumper for mounting in a horizontally oriented non-round recess of a vehicle mount receiver, the bumper comprising:

a straight leg adapter portion of a shape for non-rotational sliding engagement within the receiver recess, and a straight cross-bar portion, the later integrally fastened to, and supported by, the straight leg adapter portion at right angles thereto such that with the straight leg adapter portion engaged within the receiver recess and extending horizontally from the vehicle the cross-bar portion extends laterally relative to the vehicle;

a U-shaped bumper support including a linear body portion and a pair of end arms, one of the arms fixed at each end of the bumper support, and extending laterally from the body in a common direction defining a space therebetween, each of the arms having roller engagement means therein;

an elongate, cylindrical bumper roller rotationally engaged at opposing ends thereof by the roller engagement means so as to extend between the arms in the space therebetween, such that the bumper roller is free to rotate about a longitudinal axis thereof while held in a position relative to the vehicle for providing bumper protection to the vehicle;

the body further providing a first positioning means, the cross-bar portion providing a second positioning means, together the first and second positioning means communicating for positioning the bumper roller laterally relative to the rectangular recess so as to adjust the lateral position of the bumper roller.

2. The bumper of claim 1 wherein the cross-bar portion is positioned on the straight leg adapter portion to form a T-shaped assembly.

3. The bumper of claim 2 wherein the first positioning means is a linear series of apertures, the second positioning means is a single aperture, the apertures being positionable for mutual alignment and further including a locking handle of a size and shape for engaging a one of the first, and the second positioning means, when such are positioned in alignment, for locking the bumper at a selected lateral position.

4. The bumper of claim 1 wherein the first positioning means is a pair of parallel dog ears fixed to the body and extending in a common directions therefrom, the dog ears having a space therebetween for accommodating the cross-bar, and a hole in each of the dog ears positioned in common alignment, the second positioning means is a linear series of apertures, the apertures being positionable for alignment, the bumper further including a locking handle of a size and shape for engaging the first, and the second positioning means, when such are positioned in alignment, for locking the bumper at a selected lateral position.

5. The bumper of claim 1 wherein the cross-bar portion is positioned on the straight leg adapter portion to form an L-shaped assembly.

* * * * *